United States Patent [19]

Hagen

[11] 3,709,069
[45] Jan. 9, 1973

[54] DRIVE SYSTEM FOR POWERED VEHICLES
[75] Inventor: Hans Hagen, Heinrich-Buz Weg 10, Munich, Germany
[22] Filed: Dec. 22, 1970
[21] Appl. No.: 100,580

[30] Foreign Application Priority Data
Dec. 24, 1969 Germany.....................P 19 64 977.5

[52] U.S. Cl. ..........................74/865, 74/339, 74/866, 74/DIG. 5, 192/4
[51] Int. Cl. .............................................B60k 21/00
[58] Field of Search...........74/866, 865, 339, DIG. 5; 192/4

[56] References Cited

UNITED STATES PATENTS

| 3,286,543 | 11/1966 | Porter | 74/865 |
| 3,367,106 | 2/1968 | Robinson | 74/DIG. 5 |
| 3,478,851 | 11/1969 | Smyth et al. | 74/866 |
| 3,533,493 | 10/1970 | Braun | 74/339 |

Primary Examiner—C. J. Husar
Attorney—Francis D. Stephens and Hugo Huettig

[57] ABSTRACT

In a turbine driven vehicle the usual clutch between the turbine and the gear shift transmission is replaced by means for automatically controlling the turbine speed during gear shifting.

3 Claims, 1 Drawing Figure

PATENTED JAN 9 1973
3,709,069
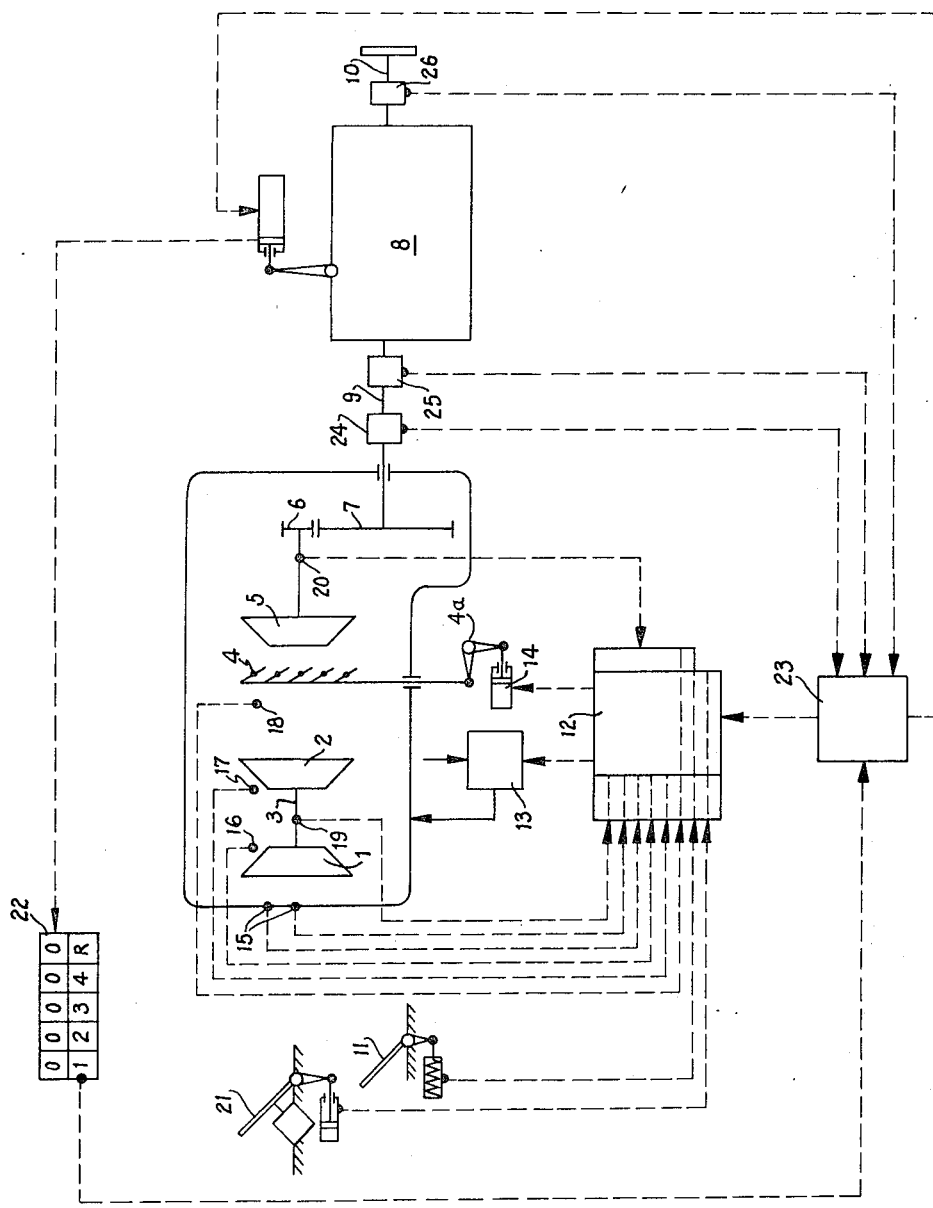
INVENTOR
Hans Hagen

DRIVE SYSTEM FOR POWERED VEHICLES

This invention relates to a drive system, especially for a powered vehicle which is composed of a gas producer or generator, a working turbine supplied with gas from the generator, a nozzle positioning actuator coupled in advance of the turbine and a drive mechanism for changing the velocity of the vehicle coupled after the turbine.

In the heretofore known forms of this type, between the turbine and the drive mechanism, which is constructed either as a simple manually operated gear shift stick or as an electronically synchronized transmission, a separating coupling, that is a clutch, is provided by means of which the turbine and transmission mechanism are unclutched for the purpose of shifting gears to change the vehicle velocity.

This coupling or clutch is subjected to so much wear and tear that it is desirable if it could be eliminated.

The heretofore known forms have also the disadvantage in that when the turbine is uncoupled from from the transmission the turbine has the tendency to runaway because the load on it is suddenly reduced to nothing. In order to avoid such turbine running away, the heretofore known systems have provided a nozzle control mechanism which alters the supply of gas from the gas generator during the declutching and which, as a rule, changes the angel at which the gas flows toward the turbine in such a manner that the turbine rpm does not increase or, at least, no desirable increase takes place or that the turbine rpm is even reduced. However, a turbine running away in this manner can only be completely prevented when the operation of the nozzle control mechanism is adapted to the short declutching times. In other words, the advancement of the nozzle control mechanism has to be done quickly and without any lag. This can only be achieved by the use of expensive techniques. In other heretofore used systems, the mechanism for changing the vehicle velocity is made in the form of a load switching mechanism so that separating coupling or the clutch between the turbine and transmission is not used. However, when a gear is shifted, then the turbine rpm must be accomplished by means of the load switching mechanism, the gear shift, which are the result of the change in gears. Because of the large turbine mass, which is imposed at a reduced speed to the input or drive shaft of the driving mechanism, high torque peaks occur on the entire drive shaft assembly between the turbine and the drive mechanism for the vehicle wheels as well as a corresponding load on the transmission gear, and which results in high tear and wear on the various parts.

The objects of this invention are to simplify the heretofore known systems and to produce a system which has a safer operation and in such a manner that with either manual gear shifts or electronically synchronized transmissions the separating coupling or clutch on one hand and the expensive nozzle positioning actuator control mechanism on the other hand can be eliminated and that the high torque peaks in the gear shift mechanism are reduced.

In general, these objectives are obtained by providing a control mechanism for the nozzle control apparatus which, for gear change, reduces in the driving mechanism and control mechanism reduces momentarily the torque power until no torque transfer takes place between the turbine and the transmission mechanism and which retards the control of the drive assembly to the new gear speed for a period of time until a synchronously smooth operation prevails for the gear drive and the turbine rpm.

In this invention, first of all, the separating coupling or clutch is eliminated, which means that the turbine and gear shift transmission are coupled with one another without a clutch. A further advantage is in that the nozzle control mechanism is no longer an element reacting to a clutch operation, on the contrary, the movement of the nozzle control mechanism itself initiates the gear change so that the control mechanism no longer takes place in such a quick manner and without retardation such as existed at great technical expense and high wear and tear as heretofore discussed. Finally, no unfavorable high torque peaks occur when the gears are changed and the engine load is changed because of the synchronous running of the driving shaft and the driven shaft of the driving mechanism.

The means by which the object of the invention are obtained are described more fully with regard to the accompanying schematic drawing of the system of this invention.

The conventional gas generator includes a compressor 1 and turbine 2. Compressor 1 and turbine 2 are mounted on the same shaft 3. The gas generated in the gas generator 1, 2 and 3 is fed through nozzle positioning actuator 4 (variable nozzles) to work turbine 5. Turbine 5 is joined by gears 6 and 7 to the transmission gears 8 by means of the driving shaft 9 and the driven shaft 10.

Driven shaft 10 is jointed to the driven wheels of a powered vehicle by conventional shafts and joints. Within the gear shift mechanism 8 the desired gear is adjusted in a conventional manner by means of a gear shift lever, and the control of the drive mechanism takes places by means of the gas pedal 11 by way of the primary control device 12. This primary control device 12 controls the gas turbine 1, 2 and 3 by way of fuel control element 13 and the nozzle positioning actuator 4 by way of control element 14, these being dependant upon the position of gas pedal 11 and with consideration of the usual values of other influencing conditions which, in general, belong the influx pressure and temperature valves 15 for the compressor, the final pressure condition value 16 for the compressor, the intake turbine temperature 17, the exhaust turbine temperature and/or the intake temperature at the value, the gas generator rpm 19 and, finally, the work turbine 5 rpm taken at point 20. If the drive mechanism is also used for vehicle braking, then a corresponding function is produced from the brake pedal 21. The adaption of the system to the desired speed or gear, which is to be adjusted in the customary manner by means of a gear shift lever to operate the transmission with a gear, takes place from the key operated control panel 22. The individual keys of control panel 22 are coupled to control apparatus 23, which may be structurally integral with the primary control apparatus 12, and the torque sensors 24, 25 and 26 are coupled to the secondary control apparatus 23.

The secondary control apparatus 23 for the transmission gear control or electronic synchronism of gear is described in the journal "ATZ" 71 (1969), 11, page 410 (FIGS. 10 and 11) or in the journal "Verkehrsrundschau" 47 (1969), pages 1362/63 ("Elektrohydraulisches Schalten ohne Krach im Getriebe - Die Symo-Schaltung funktioniert jetzt") or in U.S. Pat. No. 3,417,640.

The electronic control system (primary control device 12) for the control of the gas turbine, f.i. control of fuel metering and movement of nozzle positioning actuator is described in the journal "Gas turbine international" 1970, pages 15/19 ("Ford goes to electronical control for max reliability and economy").

The transmission gear shift 8 can be a load control drive mechanism, a conventional manually controlled shift or an electrically synchronized drive mechanism. This invention is especially important for the last two mentioned drive types, or rather transmissions, because when these drive mechanism types are used very high requirements are necessary for controlling the nozzle actuator as in the case of using a separating coupling or clutch. The elimination of this clutch is of special advantage for these drive mechanism types. In vehicles having a load switching drive mechanism a separating coupling is not used at the present time, however, when this invention is used, it has the advantage that the torque peaks are substantially reduced.

This invention operates in a vehicle substantially as follows:

1. Starting of the engine with the gear shift lever 8 in the neutral position. The turbine 5 rpm is dependant upon the idling rpm of the gas generator 1, 2 and 3, the momentary position of the nozzles in nozzle actuator 4 and the momentary load of other apparatus, such as air, air conditioning, lighting system.

2. In order to put in any desired gear in transmission gear shift 8, turbine 5 is controlled by means of nozzle actuator 4 so momentarily it is inoperative. The gear can then be shifted without any trouble at all. The shift is manual, or preferably by bell crank 4a connected to a servo mechanism.

3. The starting of the vehicle drive takes place while the turbine is unloaded, the nozzle actuator 4 being controlled in such a way that, depending upon the position of the gas pedal 11, either maximum or a reduced acceleration is obtained.

4. Switching into high gear:

4-1. The variable nozzles in nozzle actuator 4 are opened.

4-2. The existing gear speed is changed within the transmission gear mechanism at the moment that the zero throughput of the momentum passes from the sensor 24 to the secondary control apparatus 23.

4-3. The turbine 5 rpm is reduced during the gear change by adjusting the nozzles in actuator 4 by means of control element 14.

4-4. The next higher gear is automatically shifted when the rpm of driving shaft 9 and driven shaft 10 are synchronized. This synchronous rpm is determined by comparing the value of sensors 25 and 26 within the secondary control apparatus 23.

4-5. The variable nozzles in actuator 4 are again adjusted to the desired acceleration independantly of the position of the gas pedal 11.

5. Throttling or shifting back:

5-1. Through the rpm control it is determined whether a shifting is permissable.

5-2. The nozzles in actuator 4 are opened.

5-3. When the zero momentum throughput is achieved, the existing speed gear is shifted out.

5-4. Turbine 5 is accelerated by the amount of the difference in the gear shift by means of moving the variable nozzles in actuator 4.

5-5. When the rpm's are synchronized, then the next lower gear is shifted in.

5-6. The nozzles in actuator 4 are adjusted to the desired acceleration and/or power independantly of the position of the gas pedal 11.

This method ensures that a sudden loss of power in turbine 5 during gear shifting does not occur. The requirements for the adjustment of the nozzle positioning actuator 4 are no longer dictated by the extremely short time period which arises during sudden clutching or unclutching. The moving of the actuator then takes place over a longer time period which brings certain advantages with regard to the apparatus and control expense and the temperature changes in the turbine.

In order that during a brake, which is synonymous with a sudden or rapid load reduction, the turbine 5 does not run away, a corresponding restriction of the rpm may not begin only when a certain predetermined rpm borderline exists, but rather to the contrary, when a certain acceleration limit has been exceeded it would not arise through the provided control during normal vehicle operation. In this manner, the present invention makes possible the gaining of the necessary time in order to be able to prevent the running away of turbine 5 even with more slowly operating apparatus.

This invention solves problems which have a special significance in driving mechanism for powered vehicles, which is the reason that the drive system is primarily sought for use on such powered vehicles. Basically usable by this invention for all types of vehicle drives is a transmission gear shift mounted between the gas generator which functions as the engine and vehicle driven part.

In a construction that is simple as possible, torque sensor 24 is position at an especially favorable point on the shaft assembly from the turbine gear to the driven shaft between the transmission gear 8 and the vehicle wheels. It is noted that the gear transmission composed of gears 6 and 7 and leading to the gear shaft mechanism is only an example. When the gears 6 and 7 are helical gears, it is possible that the torque sensor is composed especially of an element emitting proportional signals, and especially an element which receives the axial force and emits signals that are proportional to the axial force and which is combined with the positioning of the transversely toothed gear wheel 7.

Having now described the means by which the objects of this invention are obtained,

I claim

1. In a drive system for powered vehicles comprising a gas generator, a turbine driven by gas from said generator and transmission gear changing means coupled to said turbine, the improvement comprising a control apparatus, nozzle positioning actuator means coupled to said control apparatus for reducing the turbine speed until no torque transfer takes place between said transmission gear and said turbine for a gear change and for changing the turbine speed until it is synchronized with the transmission gear speed during the change of gears.

2. In a system as in claim 1, further comprising primary control means, and said control apparatus being an integral part of said control means for the operation of the shifted gear.

3. In a system as in claim 2, said transmission gear changing means being coupled to said turbine by meshed gears, and torque sensing means joined to the output gear of said meshed gear and connected to said control apparatus for transmitting a signal proportional to the torque on and position of said output gear.

* * * * *